United States Patent [19]

Giuffrida

[11] Patent Number: 5,346,924
[45] Date of Patent: Sep. 13, 1994

[54] HETEROGENEOUS ION EXCHANGE MATERIALS COMPRISING POLYETHYLENE OF LINEAR LOW DENSITY OR HIGH DENSITY HIGH MOLECULAR WEIGHT

[75] Inventor: Anthony Giuffrida, North Andover, Mass.

[73] Assignee: IP Holding Company, Wilmington, Del.

[21] Appl. No.: 949,707

[22] Filed: Sep. 23, 1992

[51] Int. Cl.$^5$ .............................. C08J 5/20; C08J 5/22
[52] U.S. Cl. ......................... 521/28; 204/296;
204/301; 264/122; 264/126; 428/364; 428/372;
428/500; 428/516; 428/521; 521/27; 521/29
[58] Field of Search ................... 521/28, 27

[56] References Cited

U.S. PATENT DOCUMENTS

| | | | |
|---|---|---|---|
| 2,681,319 | 6/1954 | Bodamer | 260/2.1 |
| 2,681,320 | 6/1954 | Bodamer | 260/2.2 |
| 3,627,703 | 12/1971 | Kojima et al. | 260/2.1 |
| 3,876,565 | 4/1975 | Takashima et al. | 260/2.1 |
| 3,957,504 | 5/1976 | Ho | 204/106 |
| 4,032,452 | 6/1977 | Davis | 210/243 |
| 4,083,768 | 4/1978 | Lee | 204/296 |
| 4,116,889 | 9/1978 | Chlanda et al. | 521/27 |
| 4,119,581 | 10/1978 | Rembaum et al. | 521/27 |
| 4,167,551 | 9/1979 | Tamura | 521/27 |
| 4,191,811 | 3/1980 | Hodgdon | 521/27 |
| 4,197,206 | 4/1980 | Karn | 210/321 |
| 4,217,200 | 8/1980 | Kedem | 204/301 |
| 4,294,933 | 10/1981 | Kihara | 521/27 |
| 4,374,232 | 2/1983 | Davis | 525/243 |
| 4,872,958 | 10/1989 | Suzuki et al. | 204/98 |
| 5,030,672 | 7/1991 | Hann et al. | 524/109 |
| 5,082,472 | 1/1992 | Mallouk et al. | 55/16 |

OTHER PUBLICATIONS

Seymour, R. B. & Carraher, C. E., "Polymer Chemistry", 2d ed., 21, (1988), Marcel Dekker (New York).
Billmeyer, Jr., F. W., "Textbook of Polymer Science", 3d ed., 366–367, (1984), Wiley (New York).
Introduction to Branched PE, *Modern Plastics Mid-Oct. 1991* p. 61.
Govindan, et al., *Studies on Interpolymer IE Membranes and Their Performance in ED Units*, Indian J. of Tech., vol. 13, Feb. 1975 pp. 76–79.
Govindan, *Desalination by ED Method*, Salt Res. Inc., 11(1), 37–46, 1975.
Adhikary et al., *Studies on Interpolymer Membranes, Part III, Cation-Exchange Membranes*, Elsevier Science Pub., B. V. Amsterdam Reactive Polymers, 1 (1983) 197–206.
Govindan et al., *Field Studies on Commercial Prototype ED Desalination Plant in India*, Prc. 6th Int. Symp. Fresh Water from the Sea, vol. 3, 75–84, 1978.
Govindan et al., *Studies on Interpolymer Membranes-Part II, Characteristics of PE based Cation and Anion Exchange Membranes*, Proc. Ion-Exch. Symp. 2550259 Ed. Gadre, Cent. Salt Mar. Chem. Res. Inst. (1978).
Adhikary et al., *Defluoridation During Deslaination of Brackish Water by ED*, Desalination 71 (1989) 301–312.

*Primary Examiner*—Fred Zitomer
*Attorney, Agent, or Firm*—Wolf, Greenfield & Sacks

[57] ABSTRACT

A novel, heterogeneous ion exchange membrane, methods for making such a membrane, and devices containing such a membrane are disclosed. Such membranes comprise linear low or linear medium density polyethylene or high molecular weight high density polyethylene as a binder and can incorporate a wide variety of ion exchange resin materials. The membranes can be fabricated using extrusion or other melt processing procedures to produce a product, which upon conditioning in water, exhibits properties adapted for use in numerous applications.

18 Claims, No Drawings

HETEROGENEOUS ION EXCHANGE MATERIALS COMPRISING POLYETHYLENE OF LINEAR LOW DENSITY OR HIGH DENSITY HIGH MOLECULAR WEIGHT

FIELD OF THE INVENTION

The invention relates to novel heterogeneous membranes, methods for producing such membranes, and apparatus employing such membranes.

BACKGROUND OF THE INVENTION

Membranes that selectively allow diffusion and adsorption of ions while excluding certain other ions and non-ionized solutes and solvents, typically referred to as ion exchange membranes, have numerous important industrial applications. Such membranes are used in electrodialysis and electrodeionization equipment as well as in devices for fractionation, transport depletion and electro-regeneration, and purification or treatment of water, food, beverages, chemicals and waste streams. The membranes are also used in electrochemical devices such as caustic/chlorine electrolysis equipment, electropaint purification equipment, and electro-organic synthesis equipment. Additionally, ion exchange membranes are used in electrophoresis devices and analytical equipment as adsorbents, and as suppressor devices for ion chromatography. They are used in chemical treatment and concentration applications via the processes of Donnan dialysis and diffusion dialysis, and they are also used in batteries and fuel cells for the production of electricity.

In each of the applications described above, numerous membrane properties must be balanced against one another in order to achieve a membrane that satisfies the desired objectives of the particular application. Among these, it is an objective to employ ion exchange membranes that have high selectivity, low solvent and non-ionized solute transfer, low diffusion resistance of the ions selected, high physical strength, and good chemical resistance. Additionally, it is desirable that such membranes be easily manufactured at low cost without the use of hazardous substances. Furthermore, ideal membranes should be easy to handle and process and should also be amenable to low cost assembly techniques during the production of devices containing such membranes.

Current commercially available ion exchange membranes are primarily of two general types: homogeneous membranes and heterogeneous membranes. A homogeneous membrane is one in which the entire volume of the membrane (excluding any support material that may be used to improve strength) is made from the reactive polymer. Examples include membranes made of sulfonated or aminated styrene-divinylbenzene polymers (SDVB membranes), polymerized perfluorosulfonic acids (PFSO membranes) or various thermoplastics with active groups grafted onto the base polymer.

Unfortunately, homogeneous membranes tend to be difficult to manufacture. They also tend to employ the use of hazardous materials during their manufacturing process since, for the most part, they must be made from base monomers. Additionally, they are difficult to modify chemically because each modification requires a change in the fundamental chemistry of the membrane.

Homogeneous membranes also tend to have limited physical strength (therefore often requiring a screen or cloth support) because the polymer produced cannot readily combine both the required physical and electrochemical properties to operate efficiently in a fabricated device. Homogeneous membranes may be either cross-linked (to provide the membrane with dimensional stability, but increased brittleness and sensitivity upon drying), or they may be non-crosslinked (to provide membranes which may be dried, but lack dimensional stability and resistance to swelling and various solvents).

In contrast, heterogeneous membranes are formed of 1) a composite containing an ion exchange resin to impart electrochemical properties and 2) a binder to impart physical strength and integrity. Typical heterogeneous membranes may be produced as "micro-heterogeneous" membranes by the paste method (in which ion exchange resin monomers are reacted to form the ultimate ion exchange resin polymer in the presence of a finely-ground inert binder polymer), or in the alternative, as "macro-heterogeneous" membranes by the physical blending of pre-polymerized ion exchange resin and binder.

Present macro-heterogeneous membranes tend to have inferior electrochemical properties as compared to homogeneous or micro-heterogeneous membranes, but they do offer a number of advantages as compared to such membranes. In particular, macro-heterogeneous membranes are easy to manufacture and can be readily chemically modified since, within limits, the binder and resin types and content can be varied without significantly modifying the manufacturing process. Macro-heterogeneous membranes also tend to be stronger than homogeneous membranes, although they still generally require a screen or cloth support. Finally, macro-heterogeneous membranes can be dried without damage to the membrane.

Unfortunately, present heterogeneous membranes are still difficult to manufacture. They typically are produced from a solvent-containing lacquer that is dangerous to handle and becomes hazardous waste. Furthermore, such membranes are often limited to the use of a binder that can be dissolved in a relatively non-toxic solvent. Finally, although not damaged upon drying, they do undergo substantial dimensional changes, thus making it difficult to fabricate them into devices in which drying may occur.

The most common macro-heterogeneous membrane is a composite containing a styrene-divinylbenzene (SDVB) based resin, a polyvinylidenefluoride (PVDF) binder, and a polypropylene cloth support. The SDVB is usually mixed into a solution of PVDF dissolved in a solvent such as N-methyl pyrrolidone (NMP) to form a suspension. The suspension is coated onto the polypropylene support, dried in an oven and pressed in a heated press.

The method described above suffers from numerous disadvantages. The PVDF, NMP, and polypropylene cloth are very expensive, as is the manufacture of the suspension and the equipment required for coating, drying and pressing. The suspension itself is moisture sensitive and has a limited shelf life due to settling of the resin. Also, the NMP, after drying and extraction, is a hazardous waste material. Furthermore, although PVDF is reasonably chemically resistant in use, it can be attacked by strong bases and solvents.

The use of the polypropylene cloth, since it is not ionically conductive, has the effect of further restricting the diffusion of ions through the membrane, thereby decreasing the electrochemical properties of the membrane as compared to competitive homogeneous membranes. Also, upon cutting the membrane to a desired size for a particular application, strands from the cloth tend to become exposed, and liquid within the membrane tends to diffuse to the membrane edges through the strands (a problem common to both homogeneous and heterogeneous membranes). This causes a liquid "weeping" or leaking phenomenon that detracts from the appearance and performance of devices such as plate and frame type equipment that have membrane edges exposed to the exterior of the device.

An alternative way to manufacture heterogeneous ion exchange membranes using heat and pressure, as opposed to dissolution coating, described above is also well-known in the art. Such a method is usually used if the binder polymer is not readily dissolvable in a solvent. For example, U.S. Pat. Nos. 2,681,319 and 2,681,320 describe methods for producing heterogeneous membranes and methods for producing a film of controlled thickness. These references also describe post-conditioning of the membrane film using water.

U.S. Pat. No. 3,627,703 extended the heat and pressure technique of forming heterogeneous ion exchange membranes to include polypropylene binders and described numerous film-forming processes including extrusion. The reference describes the use of microscopically foamed and molecularly oriented polypropylene to reduce resin brittleness, thereby overcoming one of the disadvantages associated with such membranes. The reference also notes that if low crosslinked ion exchange resins are used and a hot acid or alkali conditioning procedure is followed, the conditioned membrane is dimensionally stable and pliable even when maintained in an ambient environment. However, the process was found to be ineffective with polyethylene binders, producing a brittle polyethylene membrane.

Subsequently, U.S. Pat. No. 3,876,565 sought to enhance the pliability of the heterogeneous membranes by expanding the ion exchange resins during conditioning. This was done by subjecting the membrane treatment in hot water at greater than 80° C. Further improvements were described in U.S. Pat. No. 4,294,933 which sought to prevent micro-cracks, said to be produced during the formation process described in U.S. Pat. No. 3,876,565, by creating siloxane bridging linkages between the ion exchange resin and a vinyl-silane polyolefin copolymer binder. The reference also describes the use of lubricants in the formulation.

In view of the foregoing, it is clear that a need exists for techniques to allow the manufacture of polyolefin-based heterogeneous ion exchange membranes that are crack-free and pliable and that do not require a support screen to provide strength and integrity. In addition, a need exists for polyolefin based heterogeneous ion exchange membranes that can be formed simply, inexpensively, and without the use or generation of hazardous materials.

OBJECTS AND SUMMARY OF THE INVENTION

It is one object of the present invention to provide a polyolefin-based heterogeneous ion exchange membrane that is pliable and substantially crack-free.

It is another object of the present invention to provide a polyolefin-based heterogeneous ion exchange membrane that can be formed from numerous melt technologies that include heat pressing, extrusion, and the like.

It is a still further object of the present invention to provide a polyolefin-based heterogeneous ion exchange membrane that retains its physical, chemical, and dimensional properties upon drying.

It is yet another object of the present invention to provide a polyolefin-based heterogeneous ion exchange membrane that, during its manufacture, uses and generates a minimum of toxic or otherwise hazardous materials.

It is still a further object of the present invention to provide a polyolefin-based heterogeneous ion exchange membrane adapted for use in numerous applications.

It is another object of the present invention to provide a polyolefin-based heterogeneous ion exchange membrane that can be easily chemically modified during the membrane fabrication process.

It is yet another object of the present invention to provide methods for fabricating the membranes described above.

It is still a further object of the present invention to provide apparatus incorporating the membranes described above.

In general, the invention comprises an improved heterogeneous ion exchange membrane using a binder comprising a linear low density polyethylene (LLDPE) or a high molecular weight high density polyethylene (HMWHDPE) and methods for making the same. The membrane is fabricated from granules or pellets of ion exchange resin and either LLDPE or HMWHDPE binder that are used as a raw material in a thermoplastic extrusion process, a heat pressing process, or another, similar process employing pressure and heat to create a dry composite sheet of constant width and thickness or having other controlled, formed dimensions. Membrane sheets formed by such processes are then conditioned and activated using a water treatment.

The resulting membranes are physically stronger than typical commercially available membranes to the extent that they can be readily employed within numerous devices without any need for an integral support screen. Additionally, such membranes exhibit enhanced chemical resistance over currently available commercial membranes, are low cost, and can be manufactured without the use or generation of toxic and/or hazardous materials.

Processing of such membranes is very simple since after conditioning, the membranes maintain their dimensional stability, even under normal device fabrication conditions. Furthermore, such membranes are amenable to low cost fabrication processes such as heat welding.

The inventive membranes are very smooth, which minimizes pressure losses when used in numerous applications. Additionally, such membranes present a hydrophobic surface to liquids and particles upon contact, thereby being non-fouling and easily cleanable. Finally, the manufacturing methodology of the inventive membranes makes it very easy to modify or change the active polymers that impart the electrochemical properties to the membrane, thereby allowing the manufacture of a wide variety of anionic, cationic, amphoteric and neutral membranes of various chemistries, crosslinkings, etc., all using The same general manufacturing processes.

These and other objects and features of the present invention are more fully described in the accompanying detailed description of the invention.

DETAILED DESCRIPTION OF THE INVENTION

Heterogeneous, polyolefin-based, crack-free, pliable ion exchange membranes formed by heat pressing, extrusion and the like may be fabricated using either linear low density polyethylene (LLDPE) or high molecular weight high density polyethylene (HMWHDPE) as the binder component. Any of a wide variety of ion exchange resins may be used to provide the membrane with desired electrochemical properties. The degree of crosslinking of the ion exchange resins contained in the membranes is not critical and conditioning can be carried out in water, preferably at a temperature of 80°–95° C. Such membranes preferably contain 0.4–1.2 parts per weight of ion exchange resin per part of LLDPE or HMWHDPE, depending upon the relative importance, for a particular application, of physical strength or low electrical resistivity. In applications in which physical strength is the overriding concern, a lower ratio is used, and in applications in which low electrical resistivity is more important, a higher ratio is preferred.

Such membranes are well adapted for use in electrodeionization devices. In such applications, membranes having 0.9–1.1 parts by weight of ion exchange resin to one part by weight LLDPE or HMWHDPE are preferred.

Prior to heat forming, it is preferred that the ion exchange resins have a moisture content of less than about 10%. This low moisture content can be achieved either prior to mixing the resins with the LLDPE or HMWHDPE binder material, or alternatively, during a process in which the ion exchange resin and the binder are formulated into pellets at the melting point of the binder. In a preferred embodiment, a lubricant, such as glycerol is added to the formulation at 1–15% by weight (preferably 5–10% by weight as compared to the weight) of the resin/binder mixture. Glycerol (or another such lubricant), lowers the required extrusion or forming temperature, thereby reducing heat damage to the ion exchange resins during the heat forming process. Furthermore, the use of glycerol also tends to speed the rate of water conditioning and tends to cause the wetted surfaces to "open" during activation to a greater extent, thereby exposing a greater fraction of the ion exchange resin material to process fluids in devices in which the membrane is used.

Excellent membrane properties may be obtained using films in the 0.007–0.050 inch thickness range. The resulting membranes do not require a support screen for physical integrity and can be maintained in a dimensionally stable state under ambient conditions following the hot water conditioning step.

It is surprising that membranes having LLDPE or HMWHDPE resin binders having satisfactory properties can be produced using the methods above, since membranes produced using this method but employing binders such as polypropylene, regular high density polyethylene, or low density polyethylene do not result in membranes with comparable strength, pliability, or integrity.

Polyethylene homopolymer varies in density in large part depending on the degree to which each polymer chain is branched. High density polyethylene (HDPE) is normally classified as a polyethylene with a density greater than 0.940 and typically as high as 0.974. The high density is caused by a low degree of branching, thereby allowing the polymer chains to more closely align with one another. HDPE is therefore a relatively crystalline polymer and is considered a linear polymer. Polyethylenes with a density in the range of 0.926–0.940 are sometimes referred to as medium density polyethylene (MDPE), and those with a density below 0.926 are referred to as low density polyethylene (LDPE). Throughout this disclosure, the term LDPE is intended to refer to polyethylenes having a density below 0.940, thereby incorporating MDPEs as well. In contrast to HDPEs, LDPEs are highly branched and have a low crystallinity, resulting in their lower density. Common LDPEs are not considered to be linear polymers.

Within recent years a new class of LDPEs having a high degree of linearity have been produced. These linear LDPEs are referred to herein as LLDPEs. Included in the class of LLDPEs are the linear very low density polyethylenes (LVLDPEs) having a density of below about 0.915. The highest density linear LDPE is the homopolymer with a density of about 0.940. Lower density linear polyethylenes are produced via copolymerization of substances such as propylene, butene, 4-methyl-1 pentene, hexene, or octene. These "hybrid" polymers exhibit short-chain branching, imparting the density of LDPE with much more of the linearity of HDPE. It has been found that the combination of linearity and low density provides ideal properties for producing a high quality, heterogeneous ion exchange membrane.

Another class of polyethylenes that have been found to yield desirable properties are the high molecular weight high density polyethylenes (HMWHDPEs) having a density in the range of 0.94–0.96. These materials have been found to be useful in the manufacture of heterogeneous ion exchange membranes because the high molecular weight, to some extent, offsets the brittleness that is found in membranes using common high density polyethylenes. Typical high density polyethylenes have an average molecular weight of approximately 40,000–500,000. As used herein, the term HMWHDPEs refers to those polyethylenes having an average weight greater than 200,000 and density of 0.940 or above. HMWHDPEs having a density of 0.952 have been found to yield satisfactory membranes.

An important property of all polyethylenes is the average molecular weight and molecular weight distribution. Both LLDPEs and HMWHDPEs have a relatively narrow weight distribution and tend to have a higher melting temperature than LDPEs or HDPEs of similar molecular weight. By use of LLDPEs or HMWHDPEs of selected molecular weight and comonomer, it is possible to vary the specific melting temperature of the binder used in any given membrane. This feature is important in producing an LLDPE or HMWHDPE membrane that can be heat welded to various structural components of a membrane device. The resulting LLDPE or HMWHDPE membranes can be heat welded to LDPE, HDPE, other LLDPEs, and even other polymer families such as polypropylene, by matching the melting temperatures of the membrane binder to the structural polymer to which it is to be bonded.

Heterogeneous ion exchange membranes employing LLDPE or HMWHDPE as a binder may be fabricated by providing granulated or powdered LLDPE or HMWHDPE to a mixer and heating until the material becomes molten. Ion exchange resins may then be added in powder form, preferably having a particle size less than about 100–150 micrometers. The resulting composition is then mixed to evenly distribute the ion exchange resins throughout the melt. In a preferred embodiment, a processing aid such as glycerol is mixed in. A typical weight ratio of (binder/ion exchange resin)/glycerol is (55%/45%)/5%. However, the mixture of resin/binder may include anywhere from 25–65% by weight of the ion exchange resin component. The molten mixture may Then be cast as a 0.25 inch thick sheet, cooled, and Then pelletized. Alternatively, the ion exchange powder, the LLDPE or HMWHDPE resin, and the glycerol may be mixed and sent directly to an extruder or other similar apparatus.

The pellets or powder/polyethylene mixture are dried and fed to an extruder or other polymer processing device that combines heat and pressure. Melting and film formation is preferably carried out in the 300°–350° F. range to form a sheet having an extruded thickness of approximately 0.007–0.050 inches. After extrusion, the dry rolls are typically slit, sheeted and placed into a water bath at about 90° C. for at least one hour to condition and activate the membrane. As an alternative, the formed material may be immersed directly in the water bath prior to shaping.

Although not wishing to be bound by a particular theory, the activation and conditioning step is believed to provide the membrane with its desirable properties as the result of ion exchange resin swelling during the immersion. This swelling is believed to cause cracks in the binder material which, when filled with liquid, interconnect domains of ion exchange resin and provide the membrane with its electrically conductive properties. The cracks are large enough to allow ion passage upon imposition of a voltage gradient, but are too small to allow significant bulk flow of solvent upon imposition of a pressure gradient across the membrane.

Following activation and conditioning, the membrane is removed from the water bath for subsequent use or fabrication into a device.

In deionization applications, ion exchange membranes should have moderate to high ionic permselectivity (depending on whether low to high salinity water is fed to the membrane device, respectively), low water permeability, and low electrical resistivity. Tabulated below are typical values for membranes of different manufacturers as compared to the present invention. As can be seen in the tables, anion exchange membranes made in connection with the present invention have similar permselectivity and permeability to other commercially available membranes, lower to equal electrical resistivity as compared to other heterogeneous membranes depending on membrane thickness, and equal to greater electrical resistivity as compared to homogeneous membranes (depending on membrane thickness and ratio of ion exchange resin to LLDPE).

Similarly, the cation exchange membranes made in accordance with the present invention have similar permselectivity to other membranes, lower to similar electrical resistivity as compared to other heterogeneous membranes, and equal to higher electrical resistivity as compared to the homogeneous membranes. Permeability is lower than the other membranes as well. Since permeability is a measure of micro-cracks, it can be seen that the invention has overcome the problem of micro-cracks reported in the prior art.

TABLE 1

ANION SELECTIVE MEMBRANES

| Membrane Type | Permselectivity (0.1/ 0.05 M KCl) | Permeability (ml/hr-ft$^2$ at 5 psid) | Resistivity (ohm-cm$^2$) (in 100 umho water) |
|---|---|---|---|
| Invention | 83% | 5 | 22–52 |
| PVDF 1 | 85% | 3 | 60 |
| MA-3475 | 85% | 9 | 40 |
| AMI-7001 | 87% | 19 | 55 |
| PVDF 2 | 83% | 3 | 80 |
| AMT | 88% | — | 22 |
| MA-40 | 86% | — | 35 |
| Anion 3 | 85% | — | 23 |
| SXZL anion | 82% | — | 22 |
| QZL anion | 84% | 1 | 22 |

TABLE 2

CATION SELECTIVE MEMBRANES

| Membrane Type | Permselectivity (0.1/ 0.05 M KCl) | Permeability (ml/hr-ft$^2$ at 5 psid) | Resistivity (ohm-cm$^2$) (in 100 umho water) |
|---|---|---|---|
| Invention | 89% | 2 | 27 |
| PVDF 1 | 92% | 4 | 41 |
| MC-3470 | 90% | 57 | 50 |
| CMI-7000 | 92% | 39 | 32 |
| PVDF 2 | 90% | 11 | 55 |
| CMT | 92% | — | 12 |
| MK-40 | 90% | — | 27 |
| Cation 3 | 90% | — | 26 |
| AZL cation | 86% | — | 22 |
| CZL canion | 91% | 4 | 22 |

The characteristics of the membranes listed in the Tables are as follows:

PVDF 1=Ionpure supported heterogeneous membrane with PVDF binder.

MA-3475, MC-3470=Sybron supported heterogeneous membrane with PVDF binder.

AMI-7001, CMI-7000=Membrane International supported heterogeneous membrane with PVDF binder.

PVDF 2=Hydro supported heterogeneous membrane with PVDF binder.

AMT, CMT=Asahi Glass supported homogeneous membrane.

MA-40, MK-40=Russian ion exchange membrane.

Anion 3, Cation 3=Czechoslovakian ion exchange membrane.

SXZL, QZL, AZL, CZL=Ionics supported homogeneous membrane.

Each of the commercial membranes described above requires a supporting cloth to have the physical strength to be fabricated into devices. In contrast, the present invention has the strength to function in a satisfactory manner without a supporting cloth or screen. Additionally, the absence of the cloth or screen support is the primary reason that LLDPE and HMWHDPE membranes can be produced having electrical resistivity comparable to the generally more conductive homogeneous membranes. The inventive membrane is dimensionally stable after conditioning, at which point it can be exposed to ambient environments with little or no shrinkage or damage. In contrast, other heterogeneous membranes shrink to a significant extent. Upon drying, homogeneous membranes crack and become damaged. The membrane of the present invention tends to lay flat after conditioning. The ability to lay flat is critical for maintaining close dimensional tolerances within membrane devices, and greatly simplifies device fabrication.

The inventive membrane is also extremely chemically resistant. LLDPE and HMWHDPE are known for their organic and inorganic chemical resistance. In contrast, other binder materials such as PDVF are much more susceptible to attack by alkaline compounds (which is crucial in many electrochemical processes because hydroxide ions are often produced) and solvents. Similarly, polypropylene binders are more susceptible to chlorine attack.

Homogeneous membranes are much more susceptible to chlorine and solvent attack because the active resin surface is not shielded from reactive species and upon subsequent loss of water content they can shrink and crack. In addition, many homogeneous membranes use PVC-like supporting cloth, which also has limited solvent resistance. In some instances, the membranes of the present invention are even more chemically resistant than the PFSO-based membranes due to the fact that the present membranes use crosslinked resins which are more dimensionally stable. In contrast, non-crosslinked PFSO membrane performance can be severely degraded in the presence of swelling agents such as solvents or acids.

In another aspect of the invention, the inventive membranes display enhanced fouling resistance over homogeneous membranes because the active surfaces of such homogeneous membranes are more exposed to slow diffusing foulants. Heterogeneous membranes tend to be lower in fouling because they present a macrosurface of the binder material rather than the active resin. The membranes of the present invention display very little fouling because LLDPE and HMWHDPE binders exhibit hydrophobicity. This effect also allows the membrane to be more easily cleaned than conventional membranes.

Among the membranes described above, the inventive membrane is the lowest in cost and easiest to manufacture because it does not make use of the support cloth, and because LLDPE are HMWHDPE are generally inexpensive and readily available from a number of suppliers. Furthermore, no modification of the LLDPE or HMWHDPE is required during the membrane fabrication process. Additionally, the inventive membrane can use mass-produced relatively low cost ion exchange resins for most applications.

Aside from raw material costs, the present membrane is also inexpensive due to its simple manufacturing process. The inventive membrane is manufactured using the steps of formulation, extrusion or heat processing, and hot water conditioning, all of which use standard low cost manufacturing equipment. The manufacturing process uses no hazardous solvents or chemicals and allows the membrane chemistry to be readily modified, since essentially any commercially available ion exchange resin can be used as an active ingredient.

The ability to extrude and mold the formulated composite allows flexibility in the final shape and function of the membrane. Therefore, membranes of the present invention can be used not only as chemically active materials, but they can also be formed into a shape that allows a combination of chemical activity with the physical structure of a device. For example, the active membrane can be shaped into a support spacer, a screen or a water conduit. The inventive membrane can also be formed in The shape of a hollow fiber or cylinder, shapes which at present cannot be readily created using homogeneous membranes containing crosslinked ion exchange resins. Also, the materials of the inventive membranes can be shaped into a monofilament or yarn and can be woven into a screen or cloth to be used as a conductor or chemically active woven material. Furthermore, the inventive material can be molded into powder, beads or pellets, thereby allowing it to be used in adsorption columns or as a component of a filter matrix. Granules or equivalent particles or screen can also be used in electrodionization resin packing or as a packing in other devices, similar to the packings of conventional commercially available ion exchangers.

Bonding is extremely difficult with crosslinked homogeneous membranes because they are not heat weldable. Furthermore, although PVDF heterogeneous membranes are heat bondable to PVDF forms, since PVDF is extremely expensive as a general construction material, it makes heat bonding unattractive in most applications. To date, this difficulty with commercially available membranes has limited the designs of fabricated devices because commercially available membranes can either not be bonded (oftentimes causing the potential for device leaks), or must be bonded using adhesives. Adhesive bonding is a costly and difficult process that often limits temperature and chemical resistance. In addition, adhesive bonding may add extractables to the product liquid being treated.

In contrast, inventive membranes of the type described herein are readily bondable using low cost standard heat welding techniques because they present an LLDPE or HMWHDPE surface to the welding machine, are dimensionally stable, and do not have an interfering support screen. The use of heat welding techniques means that external leaks can be eliminated from devices containing LLDPE or HMWHDPE membranes because the membranes can be integrally heat bonded to device components and because there is no internal supporting material to channel liquids to the exterior of devices employing the membranes.

LLDPE or HMWHDPE membranes of the type described herein exhibit a smoothness and hydrophobicity which combine to result in a low liquid pressure loss across the membrane's surface. This low pressure loss reduces energy consumption for pumping water through the device and reduces the structural strength requirements of the device. Alternatively, at a given pressure differential across a device, the membranes of the invention allow a higher liquid throughput.

The membranes of the present invention may be readily applied to apparatus for electrodialysis (ED) and electrodialysis reversal (EDR) processes. ED and EDR membranes must be low cost, resistant to fouling, and resistant to chlorine and cleaning chemicals. Ideally, such membranes should be resistant to elevated temperatures, result in a low pressure loss, and result in low internal and external leaks. The low pressure loss reduces pumping requirements and also allows the membranes to be spaced more closely to each other, thereby reducing power consumption caused by the electrical resistance of the water streams. For selective ion electrodialysis, selective ion exchange resins can be used as the resin component of the inventive membrane. For transport depletion electrodialysis, mixed anion and cation resins, or amphoteric resins can be used in place of the resin component of one of the anion or cation membranes. For transport of large, multivalent or slow diffusing ions, low crosslinked ion exchange resins can be used in the membrane. The low electrical resistance of the membranes described herein not only improves power consumption, but also reduces the size and cost of DC power supplies that provide the ionic driving force to the process.

For electrodeionization and electrodeionization reversal applications, the inventive membrane exhibits those advantages listed above. In such apparatus, the reduction in leakage and pressure loss advantages become even more important, along with the advantage of being able to readily bond the membranes within the device. Chemical resistance is particularly important because hydrogen and hydroxide ions are produced in situ in electrodeionization devices. Furthermore, the smoothness of the membrane simplifies automation of resin filling and removal or backwashing of the resin between membranes. Finally, the elimination of adhesives reduces the level of extractables, a significant advantage when electrodeionization apparatus is used in ultrapure water production.

The membranes of the present invention are also well suited for fractionation because of their low electrical resistance and their ability to readily incorporate different selectivity ion exchange resins. The resistance to chemicals and solvents is also advantageous. Similarly, the membranes are well suited for electroregeneration of ion exchange resins because of their chemical resistance. In particular, in the electroregeneration application, membranes must be able to withstand high concentrations of acids and bases at high current densities.

Liquids to be used in food, beverage, and chemical applications and liquid waste streams may be readily purified and modified using apparatus containing the membranes described herein. Such membranes are also well suited for purification and modification of non-water streams because of their resistance to fouling, chemicals, and elevated temperatures. Also, such membranes are desirable because they allow devices to be fabricated without adhesives and with low internal and external leakage potential.

The low pressure characteristics of the membrane are also important when processing high viscosity streams (such as sugars, and electropaints). Furthermore, the solvent resistance offers advantages in the processing of alcohols and other organic chemical containing streams. In the treatment of waste streams (such as plating waste treatment) the advantage of low cost is important not only for initial costs but also for replacement of damaged equipment caused by upsets in the water to be treated.

Devices which make use of electrochemical processes such as chlorine/caustic cells, electrolysis devices, and electro-organic synthesis devices are improved through the use of the present membranes because of the bondability and chemical and temperature resistance of the membrane. At the high operating current densities of most electrochemical devices, the low electrical resistivity of the membranes offers a large advantage. In chlorine/caustic cells, the membrane can resist oxidation (at least under some circumstances) even when incorporating standard ion exchange resins. However, even if PFSO resins are incorporated, the use of an LLDPE or HMWHDPE binder without the need for a cloth support (such as is needed in standard PSFO membranes), results in a number of advantages including a very large cost reduction, improved dimensional stability, and a much improved and simplified fabricated device.

It is contemplated that specially tailored analytical resins can be readily incorporated into LLDPE or HMWHDPE binders. This allows the use of specialty reactive media in combination with an inert binder so that activity is maintained without interference by the binder with the chemical analysis. Furthermore, the ease of molding hollow fibers and shapes from the materials of the present invention are an advantage in the design of suppressor columns. The solvent resistance of the membrane also offers an advantage in analysis applications.

Donnan and diffusion dialysis systems may be improved by the use of the inventive membranes as a result of their excellent chemical resistance, permselectivity, low cost, low permeability, and ability to be readily fabricated into various devices. Likewise, the inventive membrane is well suited for battery and fuel cell applications because of its low electrical resistance, chemical and temperature resistance, low cost, and its ability to be readily fabricated into various devices.

EXAMPLES

EXAMPLE 1

Electrodeionization—Pressure Loss

Two electrodeionization devices, each containing four cell pairs with a 13 inch flow path length, a 0.1 inch spacing between membranes, and an approximately 3.5 inch flow path width per cell were operated at a constant flow of approximately 650 ml/minute-inch$^2$ effective cross-sectional area. Water temperature was maintained at approximately 26° C. Resin beads used as filler were the same for both devices and had approximately uniform diameters of approximately 500 $\mu$m. The first device contained heterogeneous supported PVDF membranes. The second device contained LLDPE membranes made in accordance with the present invention. The ion exchange resins within the membranes were identical for both devices. Pressure loss for the first device was measured at 7 psi whereas in the second device the pressure loss was measured at only 4 psi.

EXAMPLE 2

Electrodeionization—Throughput

Two electrodeionization devices, described in example 1 above, were fed water with an equivalent conductivity of 20 microsiemens. The first device produced 17 megohm-cm deionized water at a rate of 650 ml/min-inch$^2$ cross-sectional area at two volts per cell pair applied voltage. In contrast, the second device, employing the membranes of the present invention, produced 17 megohm-cm deionized water at a rate of 1300 ml-inch$^2$ cross-sectional area at one volt per cell pair applied voltage. External leaks of 0.2 ml/minute were measured from the first device, whereas no external leaks were detected in the second device.

EXAMPLE 3

Electrodeionization—Fouling and Chemical Resistance

The electrodeionization devices described in the previous examples were operated on a water feed as described above at the same electrical current efficiencies. After six months of operation, the two devices were disassembled and inspected. The first device showed darkening, discoloration, and spalling of the anion membrane due to the in situ formation of hydroxide ions. There was no darkening, discoloration, or spalling of the anion membrane within the second unit.

Equivalents

Although the specific features of the invention are described in some examples and not in others, it is for convenience only and each feature may be combined with any or all of the other features in accordance with the invention. It should be understood, however, that the foregoing description of the invention is intended merely to be illustrative by way of example only and that other modifications, embodiments, and equivalents may be apparent to those skilled in the art without departing from its spirit.

Having thus described the invention, what we desire To claim and secure by Letters Patent is:

1. A heterogeneous ion exchange material which comprises an ion exchange resin incorporated within a binder, the binder comprising a material selected from the group consisting of (a) linear low density polyethylene and (b) high density polyethylene having an average molecular weight greater than 200,000.

2. A heterogeneous ion exchange material as in claim 1 wherein the linear low density polyethylene has a maximum density of approximately 0.940.

3. A heterogeneous ion exchange material as in claim 1 wherein the high density polyethylene has a minimum density of approximately 0.940.

4. A heterogeneous ion exchange material as in claim 1 wherein the ion exchange resin comprises a material selected from the group consisting of anionic ion exchange resins, cationic ion exchange resins, amphoteric ion exchange resins, and mixtures thereof.

5. A heterogeneous ion exchange material as in claim 1 wherein the material contains approximately 25–65% by weight ion exchange resin.

6. A heterogeneous ion exchange material as in claim 5 wherein the material contains approximately 44–55% by weight ion exchange resin.

7. An apparatus for the treatment of fluid streams which includes a heterogeneous ion exchange material comprising an ion exchange resin incorporated within a binder, the binder comprising a material selected from the group consisting of (a) linear low density polyethylene and (b) high density polyethylene having an average molecular weight greater than 200,000.

8. An apparatus as in claim 7 wherein the material is adhered to a structural element of the apparatus.

9. An apparatus as in claim 8 wherein the material is heat bonded to a structural element of the apparatus.

10. An apparatus as in claim 7 which comprises an electrodeionization apparatus.

11. A membrane which comprises the heterogeneous ion exchange material of claim 1.

12. A flat sheet which comprises the heterogeneous ion exchange material of claim 1.

13. A hollow fiber which comprises the heterogeneous ion exchange material of claim 1.

14. A solid filament which comprises the heterogeneous ion exchange material of claim 1.

15. A solid filament as in claim 1 wherein the filament is woven into a screen or cloth.

16. A particle which comprises the heterogeneous ion exchange material of claim 1.

17. A bead which comprises the heterogeneous ion exchange material of claim 1.

18. A pellet which comprises the heterogeneous ion exchange material of claim 1.

* * * * *

UNITED STATES PATENT AND TRADEMARK OFFICE
CERTIFICATE OF CORRECTION

PATENT NO. : 5,346,924
DATED : September 13, 1994
INVENTOR(S) : Anthony J. Giuffrida It is certified that error appears in the above-indentified patent and that said Letters Patent is hereby corrected as shown below:

Col.14, claim 15 A solid filament as in claim [1] <u>14</u> wherein the filament is woven into a screen or cloth.

Signed and Sealed this

Fifteenth Day of November, 1994

Attest:

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO. : 5,346,924
DATED : April 25, 2000
INVENTOR(S) : Anthony Giuffrida

It is certified that error appears in the above-identified patent and that said Letters Patent is hereby corrected as shown below:

Title page,
Title, "HETEROGENOUS" should read -- HETEROGENEOUS --.

Column 1, claim 1,
Line 27, "form" should read -- from --.

Column 2, claim 21,
Line 12, the second occurrence of "as" should read -- an --.

Column 2, claim 22,
Line 21, "then" should read -- than --.

Signed and Sealed this

Twenty-fifth Day of December, 2001

*Attest:*

*Attesting Officer*

JAMES E. ROGAN
*Director of the United States Patent and Trademark Office*

US005346924B1

REEXAMINATION CERTIFICATE (4059th)

United States Patent [19]
Giuffrida

[11] B1 5,346,924
[45] Certificate Issued Apr. 25, 2000

[54] HETEROGENOUS ION EXCHANGE MATERIALS COMPRISING POLYETHYLENE OF LINEAR LOW DENSITY OR HIGH DENSITY HIGH MOLECULAR WEIGHT

[75] Inventor: Anthony Giuffrida, North Andover, Mass.

[73] Assignee: Ionpure Technologies Corporation, Lowell, Mass.

Reexamination Request:
No. 90/005,359, May 17, 1999

Reexamination Certificate for:
Patent No.: 5,346,924
Issued: Sep. 13, 1994
Appl. No.: 07/949,707
Filed: Sep. 23, 1992

Certificate of Correction issued Nov. 15, 1994.

[51] Int. Cl.⁷ .................................. C08J 5/20; C08J 5/22
[52] U.S. Cl. .................................. 521/28; 521/27; 521/29; 204/2.96; 204/301; 264/122; 264/126; 428/364; 428/372; 428/500; 428/516; 428/521
[58] Field of Search .......................................... 521/28, 27

[56] References Cited

U.S. PATENT DOCUMENTS

| | | | |
|---|---|---|---|
| 2,514,415 | 7/1950 | Rasch | 136/26 |
| 2,794,777 | 6/1957 | Pearson | 204/151 |
| 2,815,320 | 12/1957 | Kollsman | 204/180 |
| 2,923,674 | 2/1960 | Kressman | 204/180 |
| 3,149,061 | 9/1964 | Parsi | 204/180 |
| 3,291,713 | 12/1966 | Parsi | 204/180 |
| 3,375,208 | 3/1968 | Duddy | 260/2.1 |
| 3,686,089 | 8/1972 | Korngold | 204/180 |
| 3,755,135 | 8/1973 | Johnson | 204/180 |
| 3,869,376 | 3/1975 | Tejeda | 204/301 |
| 3,989,615 | 11/1976 | Kiga et al. | 204/252 |
| 4,032,452 | 6/1977 | Davis | 210/243 |
| 4,033,850 | 7/1977 | Kedem et al. | 204/301 |
| 4,089,758 | 5/1978 | McAloon | 204/98 |
| 4,130,473 | 12/1978 | Eddleman | 204/252 |
| 4,167,551 | 9/1979 | Tamura | 521/27 |
| 4,216,073 | 8/1980 | Goldstein | 204/296 |
| 4,226,688 | 10/1980 | Kedem et al. | 204/180 |
| 4,298,442 | 11/1981 | Giuffrida | 204/180 |
| 4,430,226 | 2/1984 | Hedge et al. | 210/638 |
| 4,465,573 | 8/1984 | O'Hare | 204/180 |
| 4,473,450 | 9/1984 | Navak et al. | 204/147 |
| 4,505,797 | 3/1985 | Hodgdon et al. | 204/252 |
| 4,632,745 | 12/1986 | Giuffrida et al. | 204/301 |
| 4,636,296 | 1/1987 | Kunz | 204/182.5 |
| 4,671,863 | 6/1987 | Tejeda | 204/266 |
| 4,687,561 | 8/1987 | Kunz | 204/182.5 |
| 4,707,240 | 11/1987 | Parsi et al. | 204/290 F |
| 4,747,929 | 5/1988 | Siu et al. | 204/301 |
| 4,747,955 | 5/1988 | Kunin | 210/679 |
| 4,753,681 | 6/1988 | Giuffrida et al. | 134/22.17 |
| 4,804,451 | 2/1989 | Palmer | 204/301 |
| 4,925,541 | 5/1990 | Giuffrida et al. | 204/182.5 |

(List continued on next page.)

FOREIGN PATENT DOCUMENTS

| | | |
|---|---|---|
| 104411 | 8/1990 | China . |
| 1044411 | 8/1990 | China . |
| 0 503 589 | 9/1992 | European Pat. Off. . |
| 0 680 932 | 11/1995 | European Pat. Off. . |
| 1201055 | 9/1965 | Germany . |
| 44 18 812 | 12/1995 | Germany . |
| 52-71015 | 1/1979 | Japan . |
| 776469 | 6/1957 | United Kingdom . |
| 1137679 | 12/1968 | United Kingdom . |
| 1448533 | 9/1976 | United Kingdom . |
| WO 92/11089 | 7/1992 | WIPO . |
| WO 9532791 | 12/1995 | WIPO . |
| WO97/46492 | 12/1997 | WIPO . |

OTHER PUBLICATIONS

F. Helfferich, Ion Exchange, (1962), 60–61, McGraw Hill, (New York).

Glueckauf, Electro–Deionisation Through a Packed Bed, Dec. 1959, pp. 646–651, British Chemical Engineering.

Matečika, Continuous Production of High–Purity Water by Electro–deionisation, Apr. 1971, pp. 117–120, J. Appl. Chem. Biotechnol., vol. 21.

Walters et al., Concentration of Radioactive Aqueous Wastes, Jan. 1955, pp. 61–67, Industrial and Engineering Chemistry.

Warshawsky et al., Thermally Regenerable Polymerable Polymeric Crown Ethers, II Synthesis and Application in Electrodialysis, pp. 579–584.

Kedem et al., EDS—Sealed Cell Electrodialysis, 1983, pp. 291–299, Desalination 46.

International Search Report PCT/US97/17190, dated Jan. 15, 1998.

International Search Report PCT/US97/17189, dated Jan. 15, 1998.

Capacitive Deionization of $NH_4C10_0$ solutions with carbon aerogel electrodes, Farmer, et al., J. Appl. Electrochemistry, 26(1996), 1007–1018.

Johnson et al., Desalting by Means of Porous Carbon Electrodes, Mar. 1971, pp. 510–517, Electrochemical Technology, vol. 118, No. 3.

G.J. Gittens et al., Some Experimental Studies of Electrodeionization Through Resin Packed Beds, Mar. 1964, Harwell, Chemistry Div., U.K.A.E.A. Research Group, Atomic Energy Research Establishment.

(List continued on next page.)

*Primary Examiner*—Fred Zitomer

[57] ABSTRACT

A novel, heterogeneous ion exchange membrane, methods for making such a membrane, and devices containing such a membrane are disclosed. Such membranes comprise linear low or linear medium density polyethylylene or high molecular weight high density polyethylene as a binder and can incorporate a wide variety of ion exchange resin materials. The membranes can be fabricated using extrusion or other melt processing procedures to produce a product, which upon conditioning in water, exhibits properties adapted for use in numerous applications.

U.S. PATENT DOCUMENTS

| | | | |
|---|---|---|---|
| 4,931,160 | 6/1990 | Giuffrida | 204/301 |
| 4,956,071 | 9/1990 | Giuffrida et al. | 204/301 |
| 4,983,267 | 1/1991 | Moeglich et al. | 204/182.4 |
| 5,026,465 | 6/1991 | Katz et al. | 204/182.4 |
| 5,066,375 | 11/1991 | Parsi et al. | 204/182.4 |
| 5,084,148 | 1/1992 | Kazcur et al. | 204/95 |
| 5,092,970 | 3/1992 | Kaczur et al. | 204/98 |
| 5,106,465 | 4/1992 | Kaczur et al. | 204/98 |
| 5,116,509 | 5/1992 | White | 210/644 |
| 5,120,416 | 6/1992 | Parsi et al. | 204/182.4 |
| 5,154,809 | 10/1992 | Oren et al. | 204/182.4 |
| 5,196,115 | 3/1993 | Andelman | 210/198.2 |
| 5,203,976 | 4/1993 | Parsi et al. | 204/182.4 |
| 5,211,823 | 5/1993 | Giuffrida et al. | 204/182.4 |
| 5,223,103 | 6/1993 | Kazcur et al. | 204/95 |
| 5,240,579 | 8/1993 | Kedem | 204/182.4 |
| 5,254,227 | 10/1993 | Cawlfield et al. | 204/131 |
| 5,292,422 | 3/1994 | Liang et al. | 204/301 |
| 5,308,466 | 5/1994 | Ganzi et al. | 204/151 |
| 5,316,637 | 5/1994 | Ganzi et al. | 204/182.4 |
| 5,346,624 | 9/1994 | Libutti et al. | 210/679 |
| 5,356,849 | 10/1994 | Matviva et al. | 502/180 |
| 5,376,253 | 12/1994 | Rychen et al. | 204/301 |
| 5,434,020 | 7/1995 | Cooper | 429/210 |
| 5,444,031 | 8/1995 | Hayden | 502/180 |
| 5,451,309 | 9/1995 | Bell | 204/301 |
| 5,458,787 | 10/1995 | Rosin et al. | 210/719 |
| 5,460,725 | 10/1995 | Stringfield | 210/690 |
| 5,460,728 | 10/1995 | Klomp et al. | 210/698 |
| 5,489,370 | 2/1996 | Lomasney et al. | 204/627 |
| 5,503,729 | 4/1996 | Batchelder et al. | 204/630 |
| 5,518,626 | 5/1996 | Birbara et al. | 210/670 |
| 5,518,627 | 5/1996 | Tomoi et al. | 210/682 |
| 5,538,611 | 7/1996 | Otawa | 204/550 |
| 5,538,655 | 7/1996 | Fauteux et al. | 252/62.2 |
| 5,593,563 | 1/1997 | Denoncourt et al. | 204/524 |
| 5,679,228 | 10/1997 | Batchelder et al. | 204/524 |
| 5,679,229 | 10/1997 | Goldstein et al. | 204/524 |

OTHER PUBLICATIONS

Simons, Electric Field Effects on Proton Transfer Between Ionizable Groups and Water in Ion Exchange Membranes, 1984, pp. 151–158, Electrochemical Technology.

Simons, Nature, vol. 280, Strong Electric Field Effects on Proton Transfer Between Membrane–Bound Amines and Water, Aug. 30, 1979, pp. 824–826.

Simons, Water Splitting in Ion Exchange Membranes, 1985, pp. 275–282, Pergamon Press Ltd.

Purolite Technical Bulletin, Hypersol–Macronet™ Sorbent Resins, 1995.

Simons, The Origin and Elimination of Water Splitting in Ion Exchange Membranes During Water Demineralisation by Electrodialysis, Jan. 29, 1979, pp. 41–42, Desalination, 28.

DiMascio et al., Electrodiaresis Polishing (an Electrochemical Deionization Process), pp. 164–172.

Dow Chemical Bulletin, DOWEX 11 Type Anion Resin. No Date.

Dow Chemical Bulletin, Dowex Marathon C Cation Resin. No Date.

Korngold, Electrodialysis Processes Using Ion Exchange Resins Between Membranes, 1975, pp. 225–233, Desalination, 16.

Kedem et al., Reduction of Polarization by Ion–Conduction Spacers: Theoretical Evaluation of a Model System, 1978, pp. 143–156, Desalination 27.

Farmer et al., Capacitive Deionization with Carbon Aerogel Electrodes, Strategic Environmental Research and Development Program SERDP Project No. 436–94.

Hobro et al., Recycling of Chromium from Metal Finishing Waste Waters Using Electrochemical Ion Exchange (EIX), pp. 173–183, 1994.

Shaposhnik et al., Demineralization of Water by Electrodialysis with Ion–Exchanger Packing Between the Membranes Jul. 12, 1971, pp. 2815–2818, Voronezh Technological Institute.

Sammon et al., An Experimental Study of Electrodeionisaton and its Appliacation to the Treatment of Radioactive Wastes, Jun. 1960, Chemistry Division, U.K.A.E.A. Research Group, Atomic Energy Research Establishment, Harwell.

International Search Report, dated Dec. 30, 1993 for PCT/US93/08745.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 11, 12 are determined to be patentable as amended.

Claims 2–6, 8–10, 13–18, dependent on an amended claim, are determined to be patentable.

New claims 19–27 are added and determined to be patentable.

1. [A] *An unsupported* heterogeneous ion exchange material which comprises an ion exchange resin incorporated within a binder, the binder comprising a material selected form the group consisting of (a) linear low density polyethylene and (b) high density polyethylene having an average molecular weight greater than 200,000.

7. An apparatus for the treatment of fluid streams which includes [a] *an unsupported* heterogeneous ion exchange material comprising an ion exchange resin incorporated within a binder, the binder comprising a material selected from the group consisting of (a) linear low density polyethylene and (b) high density polyethylene having an average molecular weight greater than 200,000.

11. A membrane which comprises the *unsupported* heterogeneous ion exchange material of claim 1.

12. A flat sheet which comprises the *unsupported* heterogeneous ion exchange material of claim 1.

*19. An apparatus for the treatment of fluid streams which includes an unsupported heterogeneous ion exchange material comprising an ion exchange resin incorporated within a binder, the binder comprising a material selected from the group consisting of (a) linear low density polyethylene and (b) high density polyethylene having an average molecular weight greater than 200,000,*

*wherein the material is adhered to a structural element of the apparatus.*

*20. The apparatus as claimed in claim 19 wherein the material is heat bonded to a structural element of the apparatus.*

*21. The apparatus as in claim 19 which comprises as electrodeionization apparatus.*

*22. An electrodeionization apparatus for the treatment of fluid streams which includes an unsupported heterogeneous ion exchange material comprising an ion exchange resin incorporated within a binder, the binder comprising a material selected from the group consisting of (a) linear low density polyethylene and (b) high density polyethylene having an average molecular weight greater then 200,000,*

*wherein the heterogeneous ion exchange material is used as a filler.*

*23. The electrodeionization apparatus as in claim 22 wherein the linear low density polyethylene has a maximum density of approximately 0.940.*

*24. The electrodeionization apparatus as in claim 22 wherein the high density polyethylene has a minimum density of approximately 0.940.*

*25. The electrodeionization apparatus as in claim 22 wherein the ion exchange resin comprises a material selected from the group consisting of anionic ion exchange resins, cationic ion exchange resins, amphoteric ion exchange resins, and mixtures thereof.*

*26. The electrodeionization apparatus as in claim 22 wherein the heterogeneous ion exchange material contains approximately 25–65% by weight ion exchange resin.*

*27. The electrodeionization apparatus as in claim 26 wherein the heterogeneous ion exchange material contains approximately 44–55% by weight ion exchange resin.*

* * * * *